Patented June 14, 1932

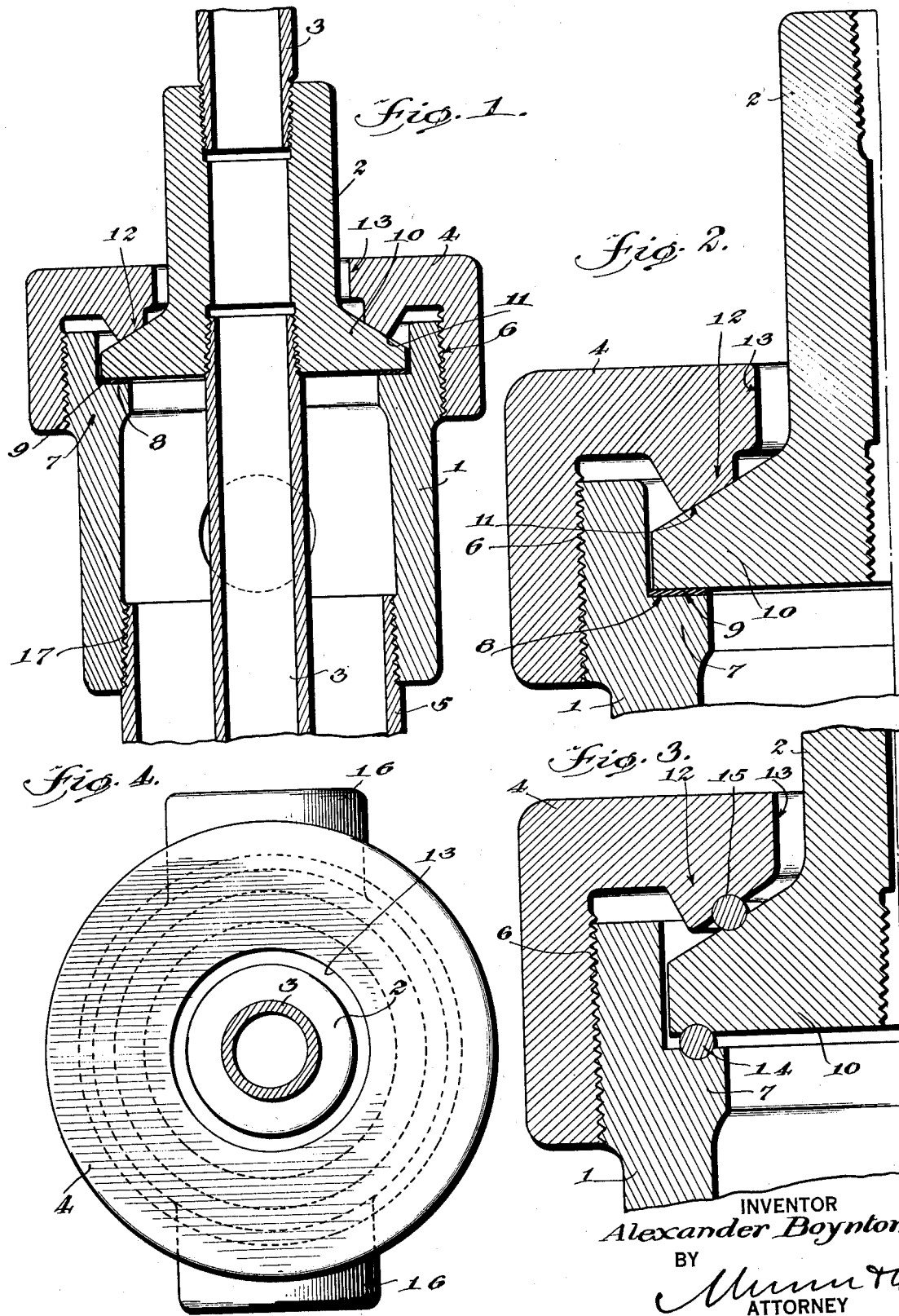

1,862,920

UNITED STATES PATENT OFFICE

ALEXANDER BOYNTON, OF SAN ANTONIO, TEXAS

CASING HEAD

Application filed November 23, 1927. Serial No. 235,310.

This invention relates to improvements in casing heads and it consists of the constructions, mode of operation and advantages herein described and claimed.

An object of the invention is to provide means in a casing head for ensuring a fluid-tight joint between the parts of the casing head structure, the variously modified arrangement by which this object is obtained being fully developed below.

Other objects and advantages appear in the following specification, reference being had to the accompanying drawing, in which;

Figure 1 is a vertical section of a casing head constructed in agreement with the foregoing object, Fig. 2 is a fragmentary sectional view illustrating the details of Fig. 1, Fig. 3 is a fragmentary sectional view illustrating the use of metallic packing rings at the various contacting surfaces, Fig. 4 is a detail plan view of the casing head in Fig. 1.

The present invention is one of a series of improvements in casing heads, the specific purpose of these improvements being to make an effective yet simple joint between various parts of the casing head so that none of the fluid in the well casing, usually at high pressure, escapes. Several modifications are involved herein, and corresponding parts are identified by similar reference characters.

In the drawing 1 designates the main body of the casing head, 2 the carrier of the tubing string 3 and 4 the pressure or locking sleeve. The main body 1 is attached to the casing string 5 by threads indicated at 17. Screw threads 6 provide for the attachment of the locking sleeve to the main body and make possible the imposition of great pressure upon the tubing carrier.

In order to effectually utilize the desired pressure after the means for acquiring it has been devised, the main body 1 is enlarged at 7 to define a base upon which the tubing carrier 2 may rest. A portion of the base is surfaced at 8 to provide a seat, and upon this seat is laid a ground copper or other gasket 9 with which the tubing carrier 2 has actual contact.

The bottom portion of flanged tubing carrier member is made straight on the under side and inclined at 11 on the upper side. An appropriately formed circular flange or projection 12 on the under side of the pressure sleeve 4 engages the inclined surface 11 for the obvious purpose of pressing the flange 10 into tight engagement with the gasket. In practice it may be deemed expedient to lubricate the contacting surfaces of the flanges 10 and 12 and to this end the opening 13 in the sleeve 4 is made somewhat larger than the upward projection of the tubing carrier which it surrounds so that the lubricant may be supplied from an oil can.

Fig. 2 merely illustrates the details of Fig. 1 to better advantage. The relationship of the various parts is readily seen. The reader can easily understand that screwing or turning the pressure sleeve 4 in the proper direction will result in a tight application of the rim of the flange 10 to the gasket 9 and of the gasket to the seat 8 of the base 7. It is at this point that the joint is made in sufficiently tight engagement of the various parts to effectually seal the casing head against the escape of internal pressure fluid.

In Fig. 3 the arrangement is somewhat different, in that copper, or other packing rings 14 and 15 are made use of. The ring 14 replaces the gasket 9, and the ring 15 takes up the friction formerly distributed between the contacting surfaces of the flanges 10 and 12. It is to be observed that the adjoining surfaces of the seat 8 and flanges 10 and 12 are made concave in order to more readily receive the packing rings and hold them in the desired position. It is evident that turning of the pressure sleeve 4 in the proper direction, will produce a compression of each ring so that fluid-tight seals are made.

Fig. 4 discloses a feature quite common to all of the modifications of the present series of casing heads. Trunnions 16 in practice, are provided with openings through which either gas under pressure may be introduced, or through which the liquid of the well may be discharged. These trunnions are usually made integrally with the main body 1 and one of the aforementioned openings is indicated by dotted circle in Fig. 1.

I claim:—

1. A casing head comprising a main body having a seat, a carrier for the tubing string of a well having a flange with an inclined upper side, a pressure sleeve threaded upon the main body, and a circular projecting flange on the sleeve having a correspondingly inclined contacting surface engaging the inclined upper side of the carrier for urging the carrier flange toward the seat.

2. A casing head comprising a main body, a carrier seated on the main body, a pressure sleeve secured to the main body having an opening larger than a portion of the carrier which is received by the opening, said opening admitting a lubricant, and a circular flange depending from the pressure sleeve, bearing on the carrier and defining a compartment by which the lubricant is received.

3. A casing head comprising a main body having an enlarged portion defining a base, said base being annularly recessed to provide a seat, a carrier having a flange fitted in the recess, the underside of the flange being level to engage the seat, the upper side of the flange being inclined, a pressure sleeve screwed on said base and having an opening larger than a protruding portion of said carrier, and a circular flange depending from the pressure sleeve bearing on the inclined surface of the carrier flange and defining with said flange an internal compartment for the reception of lubricant from said opening.

Signed at San Antonio in the county of Bexar and State of Texas this 28th day of October, A. D. 1927.

ALEXANDER BOYNTON.